(12) United States Patent
Sox et al.

(10) Patent No.: US 8,339,694 B1
(45) Date of Patent: *Dec. 25, 2012

(54) INCOHERENT SPECTRAL BEAM COMBINING WITH OPTICAL PATH COMPENSATION USING REAL TIME HOLOGRAPHY

(75) Inventors: Daniel J. Sox, Redondo Beach, CA (US); Dennis M. Guthals, Thousand Oaks, CA (US); Margarita A. Carbon, Calabasas, CA (US); Blair F. Campbell, Chatsworth, CA (US)

(73) Assignee: The Boeing Company, Chicago, IL (US)

( * ) Notice: Subject to any disclaimer, the term of this patent is extended or adjusted under 35 U.S.C. 154(b) by 387 days.

This patent is subject to a terminal disclaimer.

(21) Appl. No.: 12/635,696

(22) Filed: Dec. 10, 2009

(51) Int. Cl.
*G03H 1/08* (2006.01)
(52) U.S. Cl. .......................... 359/9; 359/15; 250/201.9
(58) Field of Classification Search .................. 359/349
See application file for complete search history.

(56) References Cited

U.S. PATENT DOCUMENTS

| | | | |
|---|---|---|---|
| 5,148,323 A | 9/1992 | Campbell et al. | |
| 5,258,860 A | 11/1993 | Schehrer et al. | |
| 6,249,381 B1 * | 6/2001 | Suganuma | 359/618 |
| 7,505,138 B2 | 3/2009 | Guthals et al. | |
| 7,710,639 B2 * | 5/2010 | Cottingame et al. | 359/349 |
| 7,796,326 B1 * | 9/2010 | Shay et al. | 359/349 |
| 2002/0126479 A1 * | 9/2002 | Zhai et al. | 362/244 |

OTHER PUBLICATIONS

M. T. Gruneisen, K. W. Peters, J. M. Wilkes, 'Compensated imaging by real-time holography with optically addressed liquid-crystal spatial light modulators', Proc. SPIE, vol. 3143, 1997, pp. 171-181.*
U.S. Appl. No. 12/635,691, filed Mar. 2, 2012.*
M.A.Carbon, D.M.Guthals, J.D.Logan, Wave-Optics Modeling of Real-Time Holographic Wavefront Compensation Systems Using OSSim, in: Advanced Wavefront Control Methods, Devices, and Applications III, edited by M.T.Gruneisen, J.D. Gonglewski, M.K. Giles, Proc. Spie vol. 5894, 5894131-7 (2005).

* cited by examiner

*Primary Examiner* — Arnel C Lavarias
(74) *Attorney, Agent, or Firm* — Felix L. Fischer

(57) ABSTRACT

A system for path compensation of multiple incoherent spectral optical beams incorporates an optical element combining a plurality of incoherent spectral beams to an aperture by angle using carrier frequency tilt fringes. An illumination laser is employed for reflection of an illumination beam from a target. An interferometer receives a sample of the reflected illumination beam reflected from the target and provides interference fringes. A spatial light modulator receives the interference fringes and generates a real time hologram. Relay optics are employed for transmitting the combined plurality of incoherent beams to the SLM and receiving a diffraction corrected full aperture compensated combined beam for emission to the far field.

16 Claims, 5 Drawing Sheets

INCOHERENT SPECTRAL BEAM COMBINING WITH OPTICAL PATH COMPENSATION USING REAL TIME HOLOGRAPHY

REFERENCE TO RELATED APPLICATIONS

This application is copending with application Ser. No. 12/635,689 filed Dec. 10, 2009 by inventors Margarita A. Carbon and Dennis M. Guthals entitled Coherent Beam Combining Using Real Time Holography and having application Ser. No. 12/635,691 filed Dec. 10, 2009 by inventors Daniel J. Sox, Dennis M. Guthals, Margarita A. Carbon and Blair F. Campbell entitled Incoherent Beam Combining of Parallel Beams with Optical Path Compensation Using Real Time Holography and having application Ser. No. 12/635,698 filed Dec. 10, 2009 by inventors Daniel J. Sox, Dennis M. Guthals, Blair F. Campbell and Margarita A. Carbon entitled Real Time Holographic Fringe Blazing Using Fringe Minima Detection, each of which is incorporated herein by reference as though fully set forth.

BACKGROUND INFORMATION

1. Field

Embodiments of the disclosure relate generally to the field of optical systems for laser transmission and more particularly to embodiments to combine multiple spectrally combined incoherent laser sources using a self-referenced interferometer generated hologram of the optical path to the target on a Spatial Light Modulator to remove optical path aberrations and to form a full aperture diffraction-limited far field intensity spot.

2. Background

Spectral combining of full aperture multiple incoherent laser beams provides for increased power and other desired characteristics. Current approaches for combination of incoherent beams require separate beam control or adaptive optics for each laser beam. Existing solutions combine the beams with a static grating, requiring separate wavefront control on each laser and do not add the benefit of adaptive optics to also compensate for the path to the target. Additionally very precise piston, tip and tilt tolerances are required in the beam control system and optical trains to maintain the beams within the alignment ranges of the control loops. Existing solutions combine the beams with active steering systems for each beam using a static grating requiring separate piston, tip, and tilt control on each sub-aperture and do not add the benefit of adaptive optics to also compensate for the path to the target. Optical systems which maintain the required high tolerances are complex and expensive. Additionally, conventional adaptive optical devices and controls are fragile and require constant tuning therefore becoming impractical for fieldable systems.

It is therefore desirable to provide a laser beam control system which reduces complexity, size, weight, and power, reduces the adaptive optics requirements and reduces cost while improving far field beam quality.

SUMMARY

Exemplary embodiments provide a system for path compensation of multiple combined incoherent spectral optical beams incorporating an optical element combining the beams to a common aperture. In one configuration, spectral incoherent beams are combined by angle using carrier frequency tilt fringes. An illumination laser with a wavelength near the central wavelength of the combined beams is employed for reflection of an illumination beam from a target or via backscatter. An interferometer receives a sample of the reflected illumination beam and provides interference fringes. A spatial light modulator receives the interference fringes and generates a real time hologram with a spectral bandwidth sufficient for correction of the spectrally combined multiple beams. Relay optics are employed for transmitting the combined plurality of incoherent beams to the SLM and receiving a diffraction corrected full aperture compensated combined beam for emission to the far field.

In an exemplary configuration, a beam splitter receives a portion of the reflected illumination beam to transmit that portion to the interferometer as a local reference. Also in one configuration, the interference fringes are blazed for transmission to the spatial light modulator.

The disclosed embodiments provide a method for combining optical beams wherein multiple incoherent spectral beams are first combined by angle using carrier frequency tilt fringes. An illumination laser beam is reflected off a target or returned as backscatter. The returned illumination beam as perturbed by the path to the target is received and interference fringes are formed from the returned illumination beam in an interferometer. The fringes are then transferred to a spatial light modulator and a real time hologram is generated. The combined incoherent beams are then diffracted from the SLM hologram fringes and emitted to the far field with diffractive compensation for path perturbation of each sub-aperture.

In certain embodiments employing local referenced interferometer, a portion of the returned illumination beam is segregated as a local reference and provided to the interferometer. The interference fringes are then created combining the local reference. In certain embodiments, blazing of the fringes is employed.

The features, functions, and advantages that have been discussed can be achieved independently in various embodiments of the present invention or may be combined in yet other embodiments further details of which can be seen with reference to the following description and drawings.

DETAILED DESCRIPTION

The embodiments described herein demonstrate a system for efficient and simple beam combination of multiple full aperture incoherent laser sources such as solid state, fiber, etc. having different wavelengths for directed energy, Lasercom and other applications. Several full aperture incoherent laser sources with differing wavelengths in a band of $\Delta\lambda=\pm10\%$ are combined using a self-referenced interferometer generated hologram on a Spatial Light Modulator (SLM) to remove path perturbations such as atmospheric interference between the laser and the target and form a diffraction-limited full aperture far field intensity.

Figure 1:
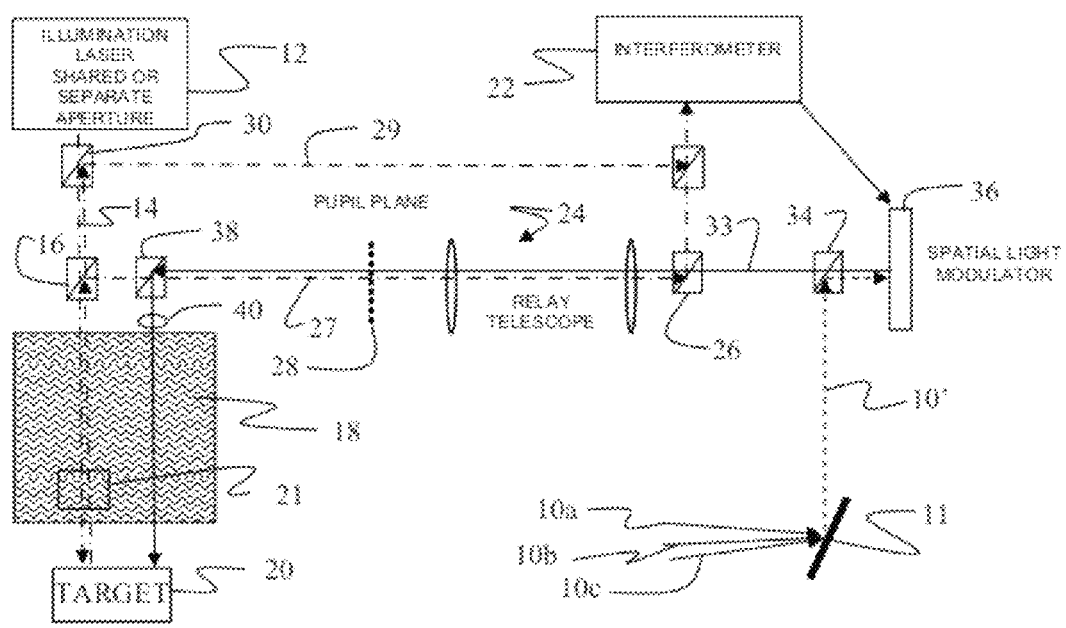
FIG. 1 is a block diagram of the elements of an embodiment.

Referring to FIG. 1 for an exemplary embodiment, multiple incoherent spectral laser sources (three for the embodiment shown) provide beams 10a, 10b and 10c to the system. The beams are combined by angle using carrier frequency tilt fringes ($n\lambda = 2d \sin(\theta)$) in optical element 11. An illumination laser 12 with a wavelength near the sub-aperture beam wavelengths provides a beam 14, which may be transmitted through a separate aperture 16 or a shared aperture with the ultimate beam output to be described subsequently, is perturbed by the atmosphere (represented by element 18) to and from the target 20. In alternative embodiments, the illumination laser may rely on backscatter (conceptually represented by block 21), similar to a guide star laser, for return of atmospheric perturbations. An interferometer 22 having a focal plane array (FPA) receives the returned illumination beam. For the embodiment shown in FIG. 1, the reflected illumination beam 14 transitions through relay optics for the system such as relay telescope 24 and beam splitter 26 designated as ray 27 additionally sampling any perturbations by the relay optics with respect to the pupil plane 28. The interferometer is self referenced with a portion of the reflected illumination beam designated as ray 29 segregated as a local reference by beam splitter 30 as shown in FIG. 1 in order to compensate for the optical path sampled by the return directed through the relay optics. The interferometer 22 creates fringes reflecting the perturbations acting on the illumination beam 14 and provides a blazed conjugate order grid to spatial light modulator (SLM) 32 for creation of a hologram.

The incoherent spectral combined beams 10' are directed through beam splitter 34 to the SLM 36. SLM 36 creates a real time hologram of the blazed grating provided by interferometer 22 which diffracts the combined beams into conjugate order. The SLM 36 effectively records the optical aberration with one wavelength of the illumination beam and the produced holographic grating compensates the incoherent spectral beams with various wavelengths that fall inside the spectral bandwidth of the hologram. The beams of different wavelengths are combined spectrally with the hologram. The corrected beam 33 is diffracted from the SLM 36 through beam splitter 34 into the relay optics including relay telescope 24 which transmit the beam through beam splitter 38 to output lens 40 as the output aperture. The individual laser beams each see a sub-aperture of the optical distortion which contains all of the phase information of the full aperture derived from the illumination beam and are therefore fully compensated and spatially overlapped at the target 20 without requirement for complex adaptive optics for each incoherent spectral beam.

Figure 2:
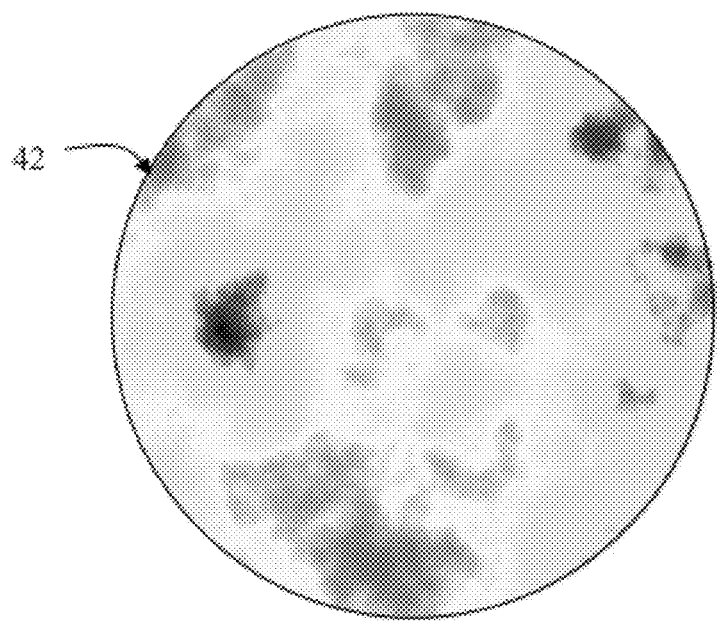
FIG. 2 is a depiction of the spectral incoherent combined beams.

FIG. 2 shows a representation of the spectral combination of three incoherent beams as combined in the aperture 42. Only one adaptive optical (AO) device, SLM 36, is required once the beams are parallel to provide complete compensation for the entire path to the target as well as the relay optics in the system.

Figure 3:
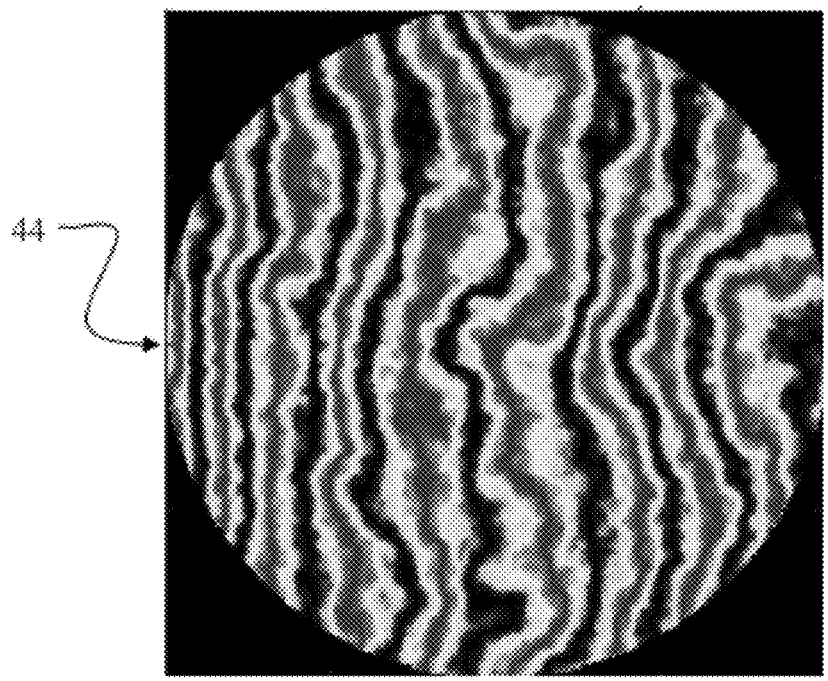
FIG. 3 is a depiction of the interference fringes of the interfered illumination laser.
Figure 4:
FIG. 4 is a depiction of the far field image for uncompensated combined incoherent beams.
Figure 5:
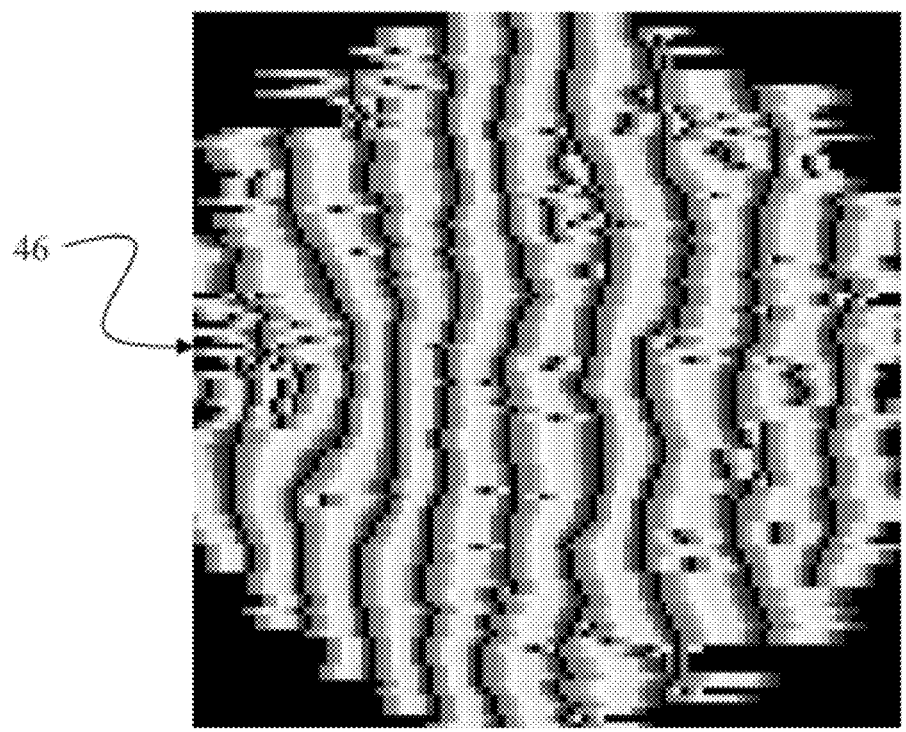
FIG. 5 is a depiction of the blazed holographic fringes provided by the Spatial Light Modulator.
Figure 6:
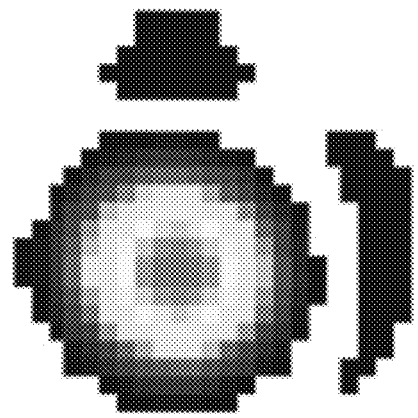
FIG. 6 is a depiction of the far field image for the phase corrected beam.

FIG. 3 shows an exemplary fringe pattern 44 at the pupil plane created by the interferometer for the aperture based on the received illumination laser beam. Without correction, the three incoherent beams would create an uncompensated beam as represented in FIG. 4 at far field at target 20 shown in FIG. 1. With compensation provided by diffraction from the real time holographic blazed fringe grating 46 of the SLM shown in FIG. 5 a representation of the three compensated and combined incoherent spectral beams are shown in FIG. 6 at target 20 of FIG. 1. The beams are combined and deliver the smallest possible far field spot size given by the sub aperture diffraction limit. Phase error is given by $\Delta\lambda/\lambda$ where $\Delta\lambda$ is the deviation in wavelength from the target illuminator.

For the embodiment shown, the SLM employed is high power dual frequency Liquid Crystal Spatial Light Modulator (LCSLM) providing 100×100 pixel resolution at 100 kW allowing eight pixels per fringe for best performance.

Figure 7:
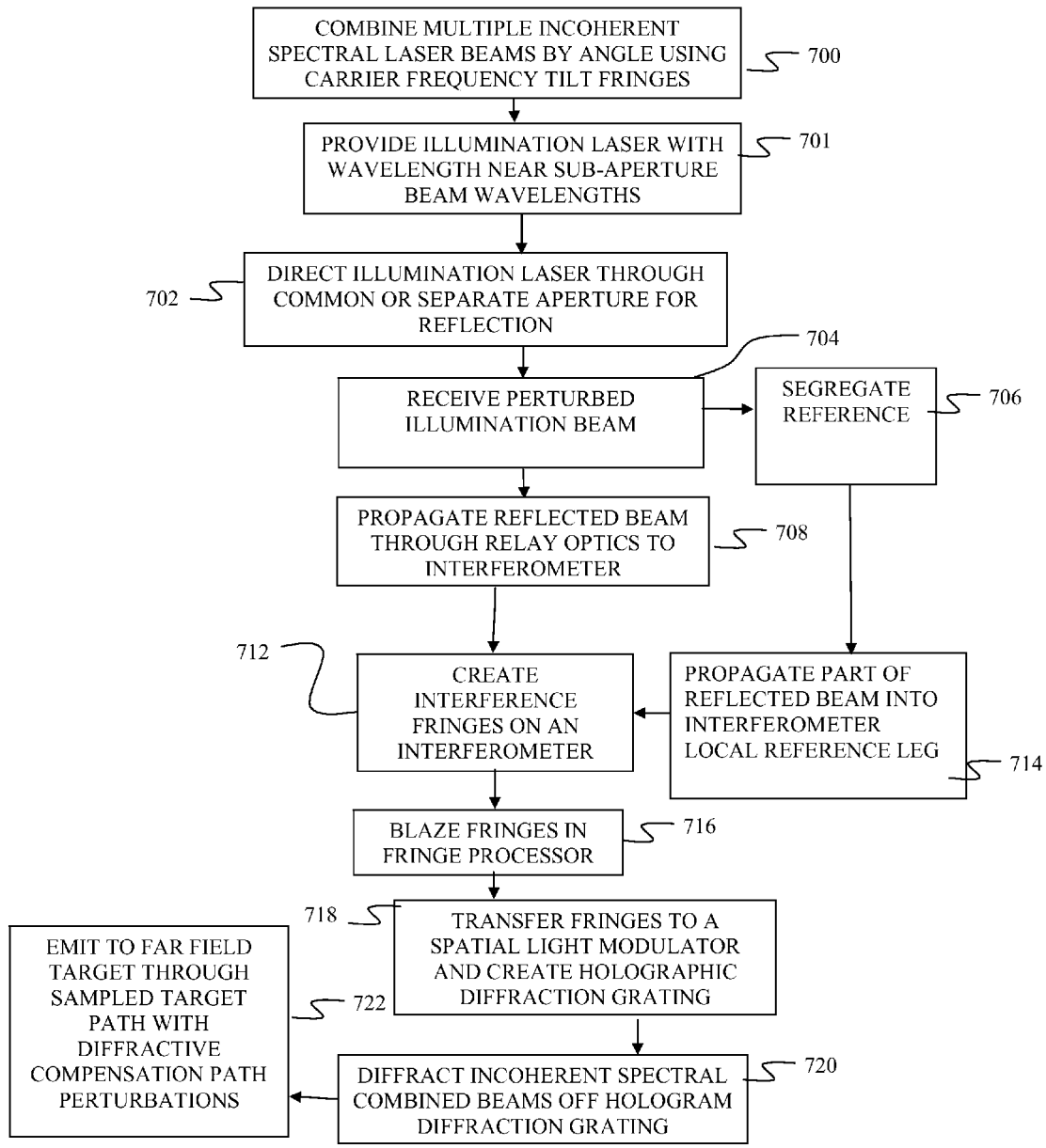
FIG. 7 is a flow chart of the method employed by the embodiment to compensate multiple subaperture incoherent laser sources for path perturbations.

The exemplary embodiment is employed as shown in FIG. 7 combine multiple incoherent spectral laser beams by angle using carrier frequency tilt fringes, step 700, provide an illumination laser, step 701, and direct the illumination beam through either a separate aperture or a common aperture with the system output, step 702. Receive the illumination beam reflected from the target or as backscatter as perturbed by the path, step 704, segregate a portion of the illumination beam as a local reference, step 706, and propagate the returned illumination beam through the relay optics to an interferometer, step 708. Create interference fringes from the perturbed reflected illumination beam in the interferometer, step 712, which may be referenced with the segregated portion of the illumination beam propagated for compensation of the optical train, step 714. The interference fringes are then blazed, step 716, and transferred to a spatial light modulator generating a real time hologram, step 718. The combined incoherent beams are then diffracted from the SLM hologram fringes, step 720, and emitted to the far field with diffractive compensation for the perturbations created by the target path for the aperture applied to each sub-aperture by the real time holographic grating, step 722.

Exemplary applications of beam correction as enabled by the embodiments disclosed include beam combination of moderate power lasers for high power application, telecommunication systems (Lasercom) and imaging systems.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A system for path compensation of multiple incoherent spectral optical beams comprising:
    an optical element combining a plurality of incoherent spectral beams to an aperture;
    an illumination laser for reflection of an illumination beam;
    an interferometer receiving a sample of the reflected illumination beam reflected from the target and providing interference fringes;
    a spatial light modulator (SLM) receiving the interference fringes and generating a hologram; and
    relay optics for transmitting the combined plurality of incoherent beams to the SLM and receiving a diffraction corrected full aperture compensated combined beam for emission to a far field.

2. The system for path compensation of multiple incoherent spectral optical beams as defined in claim 1 further comprising:
    a beam splitter receiving a portion of the reflected illumination beam to transmit the portion to the interferometer as a local reference.

3. The system for path compensation of multiple incoherent spectral optical beams as defined in claim 1 wherein the interferometer blazes the interference fringes.

4. The system for path compensation of multiple incoherent spectral optical beams as defined in claim 1 wherein the relay optics include a relay telescope for focusing a full aperture combination of the plurality of incoherent spectral beams to a pupil plane.

5. The system for path compensation of multiple incoherent spectral optical beams as defined in claim 2 wherein the plurality of incoherent spectral beams are combined by angle using carrier frequency tilt fringes.

6. The system for path compensation of multiple incoherent spectral optical beams as defined in claim 1 wherein the illumination laser is reflected from a target.

7. The system for path compensation of multiple incoherent spectral optical beams as defined in claim 1 wherein the illumination laser employs backscatter return.

8. A high beam quality multiple incoherent spectral beam laser source comprising:
- a plurality of sources for incoherent spectral beams;
- an optical element combining the plurality of incoherent spectral beams to an aperture;
- an illumination laser for reflection of an illumination beam from a target;
- an interferometer receiving a sample of the reflected illumination beam from the target and providing interference fringes;
- a beam splitter receiving a portion of the reflected illumination beam and a beam splitter to transmit the portion to the interferometer as a local reference;
- a spatial light modulator (SLM) receiving the interference fringes and generating a hologram; and
- relay optics for transmitting the combined plurality of incoherent spectral beams to the SLM and receiving a diffraction corrected full aperture compensated combined beam for emission to a far field.

9. The high beam quality multiple incoherent beam laser source as defined in claim 8 wherein
the plurality of incoherent spectral beams are combined by angle using carrier frequency tilt fringes.

10. The high beam quality multiple incoherent beam laser source as defined in claim 8 wherein the reflected illumination beam is received by the interferometer through the relay optics.

11. A method for combining multiple incoherent spectral optical beams comprising:
- combining a plurality of incoherent spectral beams by angle using carrier frequency tilt fringes;
- reflecting an illumination laser beam to form a reflected illumination beam;
- receiving the reflected illumination beam as perturbed by a beam path;
- forming interference fringes with the illumination beam in an interferometer;
- transferring the fringes to a spatial light modulator (SLM) and generating a real time hologram;
- diffracting the combined incoherent spectral beams from the the real time hologram; and
- emitting the combined incoherent spectral beams to a far field with diffractive compensation for path perturbation.

12. The method of claim 11 further comprising:
- segregating a portion of the reflected illumination beam as a local reference;
- providing the local reference to the interferometer;
- and wherein the step of forming interference fringes includes combining the local reference.

13. The method of claim 11 wherein emitting the combined incoherent spectral beams is accomplished through relay optics and further comprising:
- transmitting the reflected illumination beam through the relay optics.

14. The method of claim 11 wherein the step of transferring the fringes includes blazing the fringes.

15. The method of claim 11 wherein the step of reflecting an illumination laser beam comprises reflecting the illumination beam off a target.

16. The method of claim 11 wherein the step of reflecting an illumination laser beam comprises receiving backscatter from the illumination beam.

* * * * *